(12) United States Patent
Chou et al.

(10) Patent No.: US 6,181,996 B1
(45) Date of Patent: Jan. 30, 2001

(54) SYSTEM FOR CONTROLLING VEHICLE INFORMATION USER INTERFACES

(75) Inventors: Paul Bao-Luo Chou, Montvale, NJ (US); Jennifer Lai, Garrison, NY (US); Anthony Levas; Paul Andrew Moskowitz, both of Yorktown Heights, NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/442,454

(22) Filed: Nov. 18, 1999

(51) Int. Cl.[7] .................... G06F 165/00; H04N 7/18
(52) U.S. Cl. ............... 701/36; 701/200; 345/158; 345/166; 345/175; 340/990; 340/439; 340/735
(58) Field of Search ............... 701/36, 200; 348/118; 381/71.4; 345/158, 166, 175, 173; 340/990, 439; 781/213; 280/735

(56) References Cited

U.S. PATENT DOCUMENTS

| | | | |
|---|---|---|---|
| 5,748,748 | * 5/1998 | Fischer et al. | 381/71.4 |
| 5,781,437 | * 7/1998 | Wiemer et al. | 364/423 |
| 5,839,086 | * 11/1998 | Hirano | 701/201 |
| 5,871,232 | * 2/1999 | White | 280/735 |
| 5,938,719 | * 8/1999 | Arakawa et al. | 701/207 |
| 6,016,110 | * 1/2000 | Takinami | 340/995 |
| 6,023,290 | * 2/2000 | Seita | 348/118 |
| 6,029,110 | * 2/2000 | Zuber et al. | 701/200 |
| 6,059,843 | * 5/2000 | Kirkhart | 701/213 |

* cited by examiner

Primary Examiner—William A. Cuchlinski, Jr.
Assistant Examiner—Tuan To
(74) Attorney, Agent, or Firm—McGinn & Gibb, PLLC; Stephen C. Kaufman, Esq

(57) ABSTRACT

A system for controlling a vehicle information system user interface with at least one sensor for sensing the presence of a passenger and a controller for controlling a vehicle information system user interface based upon an output signal from the sensor.

37 Claims, 4 Drawing Sheets

VEHICLE WITH USER INTERFACE COMPONENTS

SYSTEM DIAGRAM

VIDEO DISPLAY AND AUDIO FOR DRIVER WITHOUT PASSENGER

VIDEO DISPLAY AND AUDIO WITH PASSENGER

SYSTEM FOR CONTROLLING VEHICLE INFORMATION USER INTERFACES

BACKGROUND OF THE INVENTION

1. Field of the Invention

The present invention generally relates to a vehicle, and more particularly to a vehicle including a system for detecting the presence of animate objects (e.g., passengers, pets, etc.) and for controlling the information system user interface in an appropriate manner.

2. Description of the Related Art

Computer technology for providing information and application functions to automotive vehicles is becoming pervasive. For example, vehicles are being outfitted with computers that contain display devices, speech synthesis, text-to-speech (TTS) interfaces, and a multitude of input devices such as speech recognition, remote control devices, keyboards, track balls, joysticks, touch-screens, etc.

These computerized devices are useful for controlling a vehicle or for the entertainment of the vehicle occupants (e.g., see U.S. patent application Ser. No. 09/311,277 entitled "Information System for Mobile Users", filed on May 14, 1999, and U.S. patent application Ser. No. 09/357,840, entitled "System and Method for Network Vehicle Diagnostics and Health Monitoring" filed on Jul. 20, 1999, both incorporated herein by reference).

While the above described equipment is widespread, there has been little recognition of the cognitive burden placed on a driver by these devices, particularly those which do not contribute to a driver's primary responsibility of controlling a vehicle in a safe and responsive manner.

A driver's senses may be fully occupied as a result of the large cognitive load demanded for driving a vehicle safely. To operate a vehicle safely, drivers use their hands for steering and manipulating other vehicle user interfaces such as the gear shift, turn signals, windshield wipers, heating mechanism, and parking brake. The driver also must focus attention on the road, on the traffic, and on vehicle operation devices such as rear-view mirrors, speedometer, gas gauge, and tachometer.

Distracting or complex output presented to the driver or requirements for complicated user input may result in accidents. These must be filtered or controlled while the driver is operating the vehicle. As a result, in-vehicle devices providing information unrelated to driving a vehicle should be easy to operate and not distracting.

Conversely, the same demands for attention are not placed on passengers. Therefore, a device which would be too complicated and distracting for a driver may not be rich enough information-wise for passengers who are able to focus more of their attention on a device not used to control the vehicle. Passengers are free to use computational apparatus and information delivery systems.

With the conventional systems, a problem has been the lack of tailoring of vehicle information system functions, input and output devices, and the user interface based upon composition of the passenger group.

The problem of identifying the presence of passengers in a motor vehicle and the importance of controlling vehicle safety systems has been recognized previously. Identifying passengers in a vehicle is accomplished using a variety of means. For example, force sensors, ultrasonic detectors, capacitance detectors, optical detectors, and sound detectors have been used. Passengers are detected in order to enable or advise the use of safety devices such as seat belts or air bags.

Further, the problem of adapting user interfaces has also been recognized previously. For instance, an example is found in U.S. Pat. No. 5,648,755 entitled "Display System" and incorporated herein by reference, which teaches the tailoring of the visual display for operating instruments as a function of the driving conditions of the vehicle.

However, none of the conventional systems teaches modifying an information system user interface based upon the presence or absence of passengers. Neither does any system even address the presence of detecting non-human passengers (e.g., pets, animal cargo, etc.) in a vehicle and the effect of in-vehicle devices on such non-human passengers.

SUMMARY OF THE INVENTION

In view of the foregoing and other problems, disadvantages, and drawbacks of the conventional methods and structures, the present invention has been devised.

An object of the present invention is to provide a structure for detecting the presence of passengers and for selectively controlling the information system user interface appropriately.

It is another object of the invention to detect when a non-driving passenger is using a device (e.g., providing information or entertainment) and selectively enabling the device function to be complex and more detailed for the passenger.

Additionally, it is an object of the invention to control a device used by a passenger in a manner conducive to driving safety.

In a first aspect of the invention, a system for controlling a vehicle information system user interface includes at least one sensor for sensing the presence of a non-driving passenger in a vehicle, and a controller for controlling the vehicle information system user interface based upon an output signal from the at least one sensor.

Thus, with the invention, a vehicle's information system user interface may be selectively changed depending upon whether passengers are detected in the vehicle. Further, certain distinguishing characteristics of the passengers are detected enabling additional selective change of the vehicle user interface.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
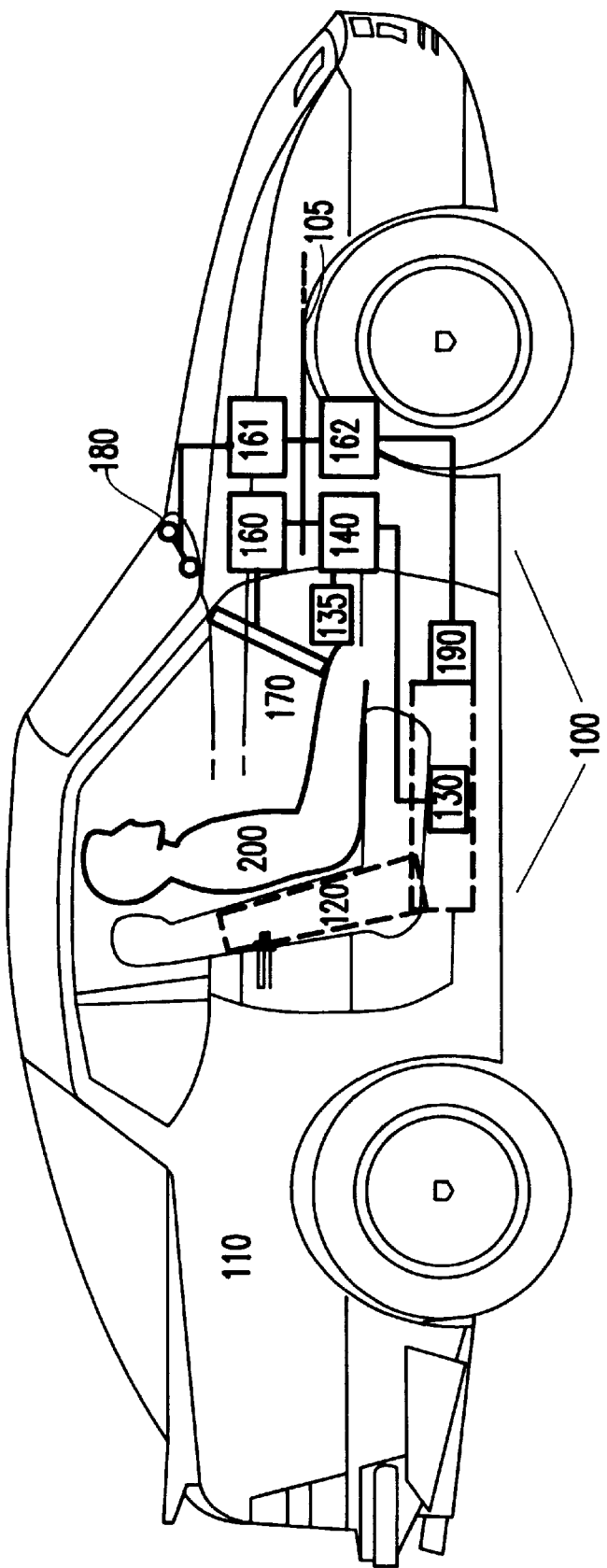
FIG. 1 is a schematic diagram of a vehicle including a seated person according to a preferred embodiment of the present invention.

Referring now to the drawings, and more particularly to FIGS. 1–5, there is shown a preferred embodiment of the present invention.

Referring to FIG. 1, a vehicle system 100 is shown for use with a vehicle 110 and includes a passenger 200 (e.g., a person) seated within a vehicle 110 having at least one sensor (e.g., sensor circuit) and more preferably a plurality of sensors located at different positions in the vehicle 120, 130, an electronic control unit (ECU) 140 (and more preferably a plurality of ECUs) for controlling sensor circuits, a vehicle communication bus 105 for carrying data and control signals to the ECU 140, an ECU 160 interfaced with the bus 105, and at least one interface device (and more preferably a plurality of interface devices) including, for example, any one or more of a visual display 170, an audio system 180.

Further, additional devices 190 may be provided. Such additional devices may include a visual display device, an audio system, a keyboard, a telecommunications device, a fax machine, a touch screen, a speech synthesis system, a voice recognition interface, a wireless remote control device, a scent dispenser, a heating device, and a cooling device.

Further, a manually-controlled input device 135 may be provided for inputting parameters to the ECU devices including the indication of the presence of one or more passengers and for overriding automatic selections if necessary.

Figure 2:
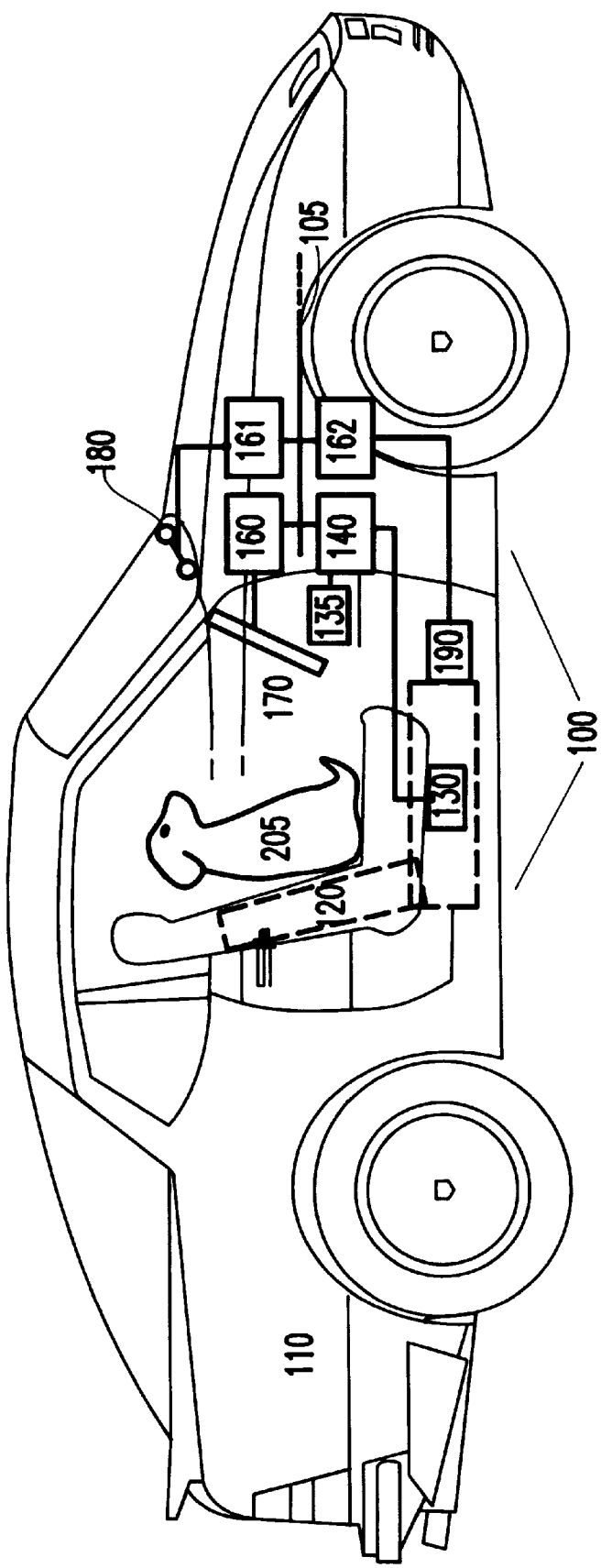
FIG. 2 is a schematic diagram of a vehicle including a seated pet and a device for detecting the presence of passengers according to a preferred embodiment of a system of the present invention.

FIG. 2 shows the same vehicle system 100 for use in a vehicle 110, including a passenger 205 (e.g., in this case a pet or animal cargo), and the other preferred features of the present invention as above described in FIG. 1.

Figure 3:
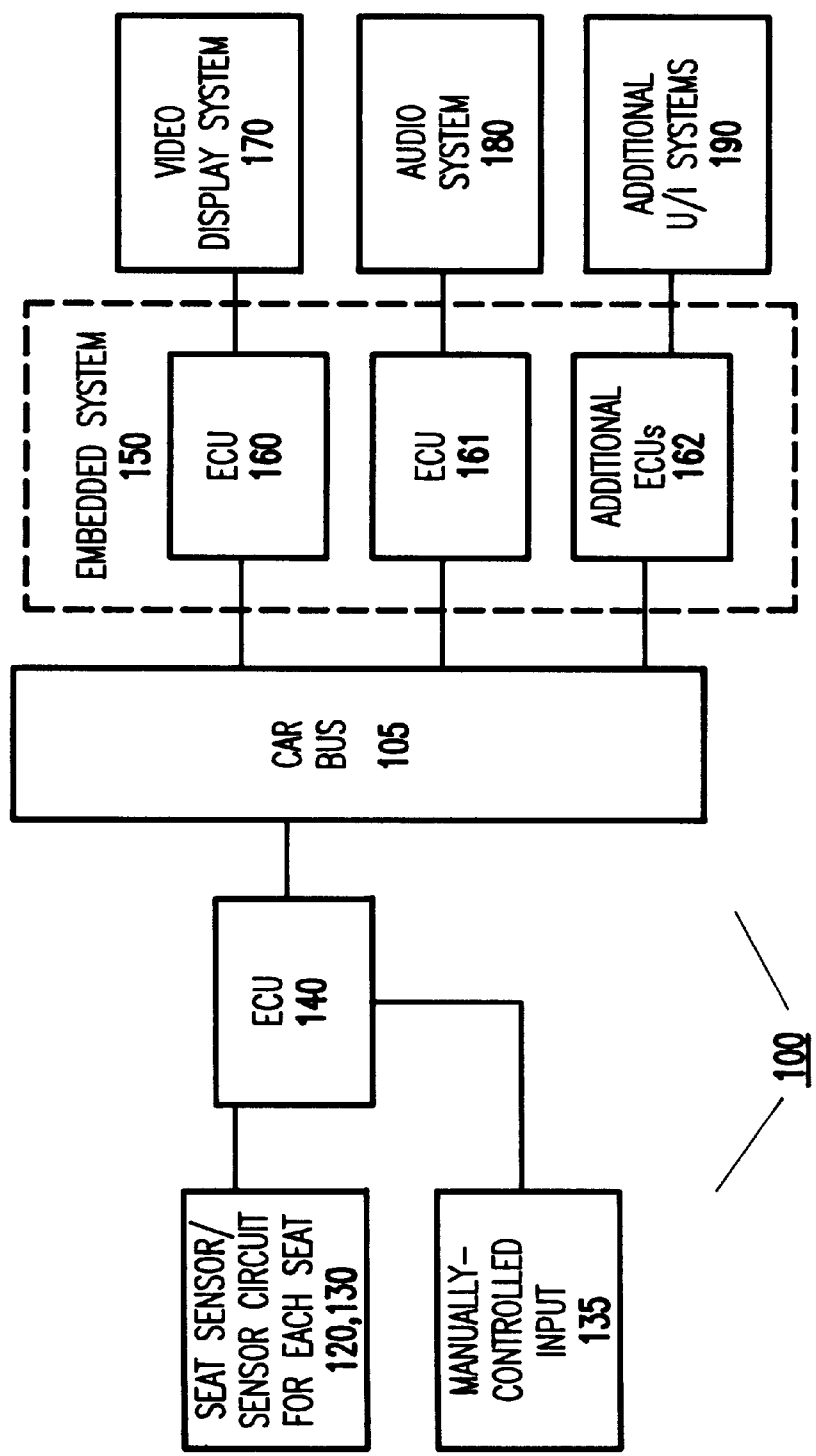
FIG. 3 is a system diagram of components according to the present invention.

Referring to FIG. 3, a block diagram of the system according to the preferred embodiment is shown and described below.

The system 100 includes a sensor 120 and a sensor 130 for detecting a passenger (e.g., 200, 205 shown in FIGS. 1–2) located inside of the vehicle 110. The sensors can be formed of known and commercially available components. Many types of sensors may be employed including any one or more of infrared sensors, capacitive sensors, force/pressure sensors, etc., and are well-known in the art. Such sensor components and configurations are described in, for example, U.S. Pat. No. 4,300,116, U.S. Pat. No. 5,402,075, U.S. Pat. No. 5,313,189, U.S. Pat. No. 5,629,488, U.S. Pat. No. 5,871,063, U.S. Pat. No. 5,297,430, U.S. Pat. No. 5,305,644, U.S. Pat. No. 5,857,536, U.S. Pat. No. 5,654,615, U.S. Pat. No. Reissue 034,773, and U.S. Pat. No. 5,602,526, each incorporated herein by reference. U.S. Pat. No. 5,404,128 incorporated herein by reference describes the detection of a passenger based upon the life activity of the human body including heart beat. Such a system using the distinguishing characteristics of heart beat (e.g. rate, shape, etc.) may be used to distinguish humans from non-humans.

The presence of a passenger causes a change in the electrical characteristics of the sensor 120. An additional passenger may change the electrical characteristics of the sensor 130. Additional sensors may be used to detect additional passengers.

The sensor's electrical characteristics are monitored by ECU 140, which responds to a change by reporting a detection code over the car bus, such as a Society of Automotive Engineers (SAE) J1850 communication bus, or a Controller Area Network (CAN).

The car bus 105 in turn provides the code to a second ECU 160 which controls an interface 170, 180. The ECUs 160, 161, and additional ECUs 162, as necessary, may be provided as components within an embedded electronic or computing system 150 within the vehicle. The structure of the user interface is believed to be well-known to one of ordinary skill in the art taking the present invention as a whole. For example, the structure of some exemplary user interfaces are described in U.S. Pat. No. 5,648,755, U.S. Pat. No. 5,847,704, U.S. Pat. No. 5,289,184, U.S. Pat. No. 5,635,924, U.S. Pat. No. 5,821,935, U.S. Pat. No. 5,555,172, and U.S. Pat. No. 5,875,108, each incorporated herein by reference.

The interface may control visual and/or audio systems 170, 180, and additional user interface systems 190.

Also, for example, the modality of input or output may be varied. If no passenger is detected in the vehicle, voice recognition may be the only input modality used (e.g., enabled by the inventive system). Video display may be turned off and audio may be provided as the only output modality. Navigation instructions may be provided to the driver by the use of translation of computer output to audio using speech synthesis (text-to-speech or TTS) or the playing of digital recordings of human speech (one such format is the .wav file).

If a passenger is detected as being present in the vehicle (e.g., as sensed by the sensor circuits), the passenger is enabled to use any graphical user interface (and associated application program(s)) such as touch screens, mouse, keyboard, electronic remote control, joystick, track point, and so forth.

Additionally, the mode or modality for presenting output information may be varied.

For example, if there is a single display screen for displaying information (e.g., the text of incoming e-mail, updated traffic conditions, driving navigation directions, etc.), then the display could be turned off, e.g., automatically by the embedded electronic or computing system 150, or simply not enabled for a solo driver and information provided only through the auditory modality (e.g., text-to-speech, recorded sound, etc.).

Various input or output devices may be enabled (or disabled) by the detection by the sensor circuit(s) of a passenger in a seat. Visual displays such as a TV monitor or a computer display screen may be enabled or have enriched display content for the use of the passengers. For example, microphones, view screens, user input devices such as keyboards, trackballs, joysticks, mice, etc. could be enabled for used by passengers detected by the sensor circuit(s) 120, 130.

The physical orientation of input and output devices also may be changed.

For example, display monitors may rotate to face passengers (rather than a driver) or an empty seat. Another option is to employ shades (e.g., louvers) or some obscuring technique (e.g., blinds and the like) which are automatically activated upon starting the vehicle and detecting that no passengers are present. The louvers allow the passenger(s) to view enriched video content but obscure the driver's view. Along these lines, such devices could be blocked from activation unless a signal is received by the sensor circuits indicating the presence of a passenger.

Moreover, the acoustic characteristics of the vehicle may be changed with the detected presence of passengers. Audio inputs and outputs may be adjusted. The speaker balance of sound systems may be shifted. Audio may be enriched with more details and voice recognition may have a richer voice command set when no passenger is detected. For example, a speech recognition model could be modified and frequency distribution of audio output tuned. A further example is if pets (e.g., dogs, cats etc. as shown in FIG. 2) are detected and audio output levels adjusted so as to not frighten the animal passengers. For example, it is well-known that cats are afraid of loud noises and that dogs are startled by high frequency noises.

Application selection could be controlled to prevent distractions to a driver. For example, video games may be blocked from being played if no passenger is detected. However, audio input and output could be selectively enabled. Applications that could be subject to vehicle system control may include navigational aids, e-mail systems, entertainment devices, mobile communication devices, news devices, and selected transactions requiring attention (e.g., banking and securities trading).

The applications may be controlled according to their complexity. This would allow the passenger to engage in activities that may require a concentration level that would be dangerous for the driver. For example, when a passenger is detected in the seat next to the driver, a visual display may be enabled for use by a passenger. Such "complexity" of applications may be determined in advance. Only large abstract icons would be shown to the driver alone instead of detailed text. Programmable buttons would be made large. In this way the display is simplified and usable by the driver at a glance or a touch of the display screen. If a passenger is detected, then the interaction may be made more detailed.

Additionally, the function of application requests made by a lone driver may be selectively tailored by the system so that the output is appropriately constructed to their attention level. For example, summarized information may be returned, length of responses could be shortened, and/or visual representations enlarged.

Figure 4:
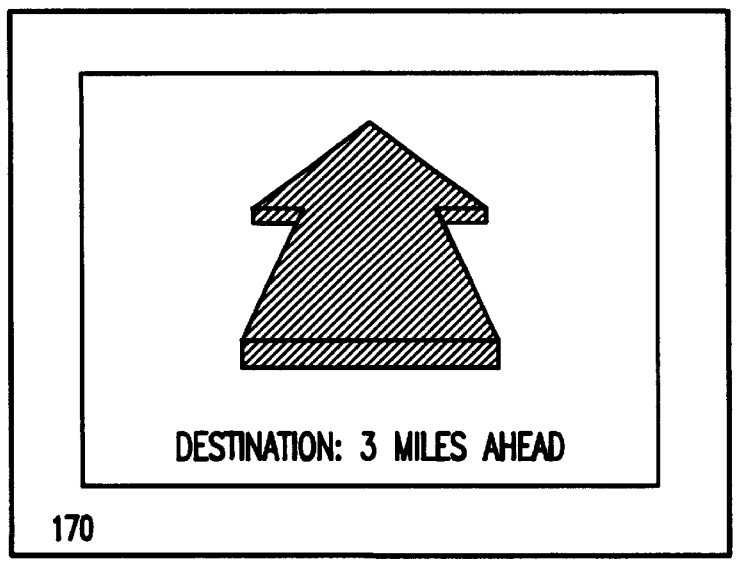
FIG. 4 depicts audio and video outputs in a vehicle with only a driver according to the present invention.
Figure 4:
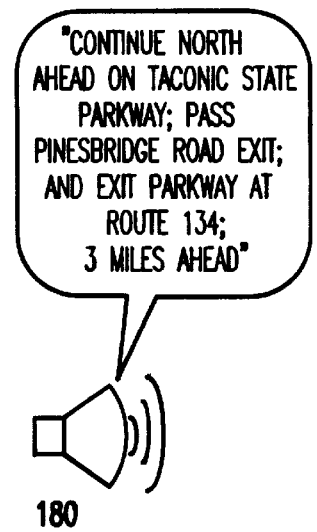
Figure 5:
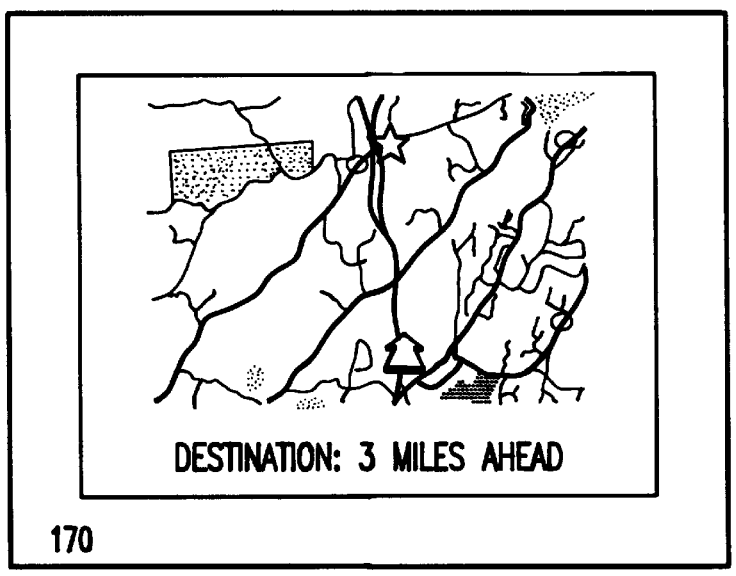
FIG. 5 depicts audio and video outputs in a vehicle with a driver and passengers according to the present invention.
Figure 5:
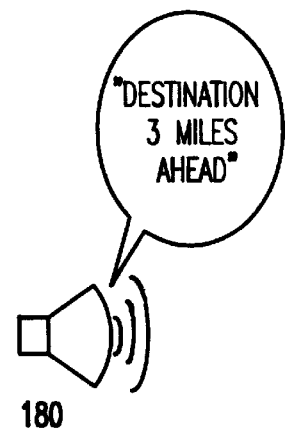

For example, FIG. 4 illustrates a simplified video display and audio for a driver without a passenger. In the example of FIG. 4, the video display is simplified, but the audio display is more detailed. In contrast, FIG. 5 illustrates a video display and audio for a vehicle with a passenger sensed. In FIG. 5, the video display is more complex, but the audio is simplified. Manual control may be used to adjust gradations of video and audio richness.

Additionally, some indicia indicating the age or maturity of a passenger could be sensed and used to enable or disable functions. For example, the weight (and/or height) of a driver or passenger could be detected and used to enable or disable functions.

For example, adult entertainment could be disabled when children (e.g., generally and relatively light-weight people) are identified as being present. Alternatively, a height of the passenger could be gauged and those having less than a predetermined height (and thus deemed to be children who are generally and relatively shorter than adults) would be barred from such adult entertainment.

Thus, with the unique and un-obvious structure of the present invention, a passenger may be detected and based on such detection, the information system user interface may be selectively controlled appropriately. Thus, adaptive user interfaces may be provided based on such detection of a passenger to make vehicle operation safer. Further, when a non-driving passenger is using a device (e.g., providing information or entertainment), the device function may be selectively made more complex and more detailed for the passenger.

Thus, with the invention, a vehicle's information system user interface may be selectively changed depending upon whether passengers are detected in the vehicle, thereby to increase utility for the passenger detected, and in the absence of a detected passenger, increase vehicle driving safety.

While the invention has been described in terms of several preferred embodiments, those skilled in the art will recognize that the invention can be practiced with modification within the spirit and scope of the appended claims.

What is claimed is:

1. A system for controlling a vehicle information system user interface comprising:
    at least one sensor for sensing a presence of a non-driving passenger in a vehicle; and
    a controller for controlling the vehicle information system user interface to selectively provide an appropriate level of interaction therewith for a driver, based upon an output signal from said at least one sensor.

2. The system according to claim 1, wherein a plurality of ones of said at least one sensor are provided at predetermined positions in said vehicle.

3. The system according to claim 1, wherein said controller comprises an electronic control unit (ECU) for processing said output signal from said at least one sensor.

4. The system according to claim 3, wherein said controller further comprises a vehicle communication bus for carrying data to said electronic control unit.

5. The system according to claim 4, wherein said controller further comprises a plurality of electronic control circuits connected to said vehicle communication bus.

6. The system according to claim 5, wherein said plurality of electronic control circuits connected to said vehicle communication bus are selectively interfaced with a plurality of devices.

7. The system according to claim 1, wherein said controller comprises means for controlling adjustable control parameters.

8. The system according to claim 1, wherein said at least one sensor for sensing the presence of a passenger senses a weight of an occupant in a vehicle seat for a non-driving passenger.

9. The system according to claim 1, wherein said at least one sensor senses a weight of a passenger and outputs a value representing said weight to said controller.

10. The system according to claim 1, further comprising:
    a car bus electrically connected to said sensor,
    wherein said bus comprises one of a Society of Automotive Engineers (SAE) J1850 bus and a Controller Area Network bus.

11. The system according to claim 6, further comprising:
    a car bus electrically connected to said sensor,
    wherein said bus comprises one of a Society of Automotive Engineers (SAE) J1850 bus and a Controller Area Network bus.

12. The system according to claim 6, wherein said plurality of devices comprise at least one of a visual display device, an audio system, a keyboard, a telecommunications device, a fax machine, a touch screen, a speech synthesis system, a voice recognition interface, a wireless remote control device, a scent dispenser, a heating device, and a cooling device.

13. A system for detection of a vehicle occupant and control of a user interface comprising:
    at least one sensor for sensing a presence of a vehicle occupant; and
    a controller for selecting one of a plurality of modes of use for a vehicle system user interface to selectively provide an appropriate level of interaction therewith for a driver, based on a composition of said vehicle occupant.

14. The system according to claim 13, wherein a plurality of ones of said at least one sensor are provided at predetermined positions in said vehicle.

15. The system according to claim 13, wherein said plurality of modes comprises:
a mode for a vehicle with a driver and no passengers.

16. The system according to claim 13, wherein said plurality of modes of use comprises:
a plurality of modes of use for application to a vehicle with a driver and a plurality of non-driving passengers having a plurality of characteristics.

17. The system according to claim 13, wherein said plurality of modes comprises:
a plurality of modes of audio presentation comprising at least one of enriched speech, simplified speech, reduced sound intensity, frequency-filtered sound, audio balance shifted to driver, and audio balance shifted to passenger.

18. The system according to claim 13, wherein said plurality of modes comprises:
a plurality of modes of video presentation comprising at least one of enriched video, simplified video, video display disabled, and video display enabled.

19. The system according to claim 13, wherein said plurality of modes comprises:
a plurality of modes of mechanical presentation comprising at least one of video display directed to driver, and video display directed to passenger.

20. The system according to claim 13, wherein said controller comprises means for controlling adjustable control parameters.

21. The system according to claim 20, wherein said parameters are programmable by a user.

22. The system according to claim 13, wherein said plurality of modes of use for a vehicle are selected manually by a user.

23. The system according to claim 16, wherein said plurality of characteristics includes said non-driving passenger having a predetermined measure of weight.

24. The system according to claim 23, wherein a second characteristic of said plurality of characteristics includes said non-driving passenger having a weight less than said predetermined measure of weight.

25. A system for detection of a vehicle occupant and control of a user interface comprising:
at least one sensor for sensing a presence of a vehicle occupant; and
a controller for selecting one of a plurality of modes of use for a vehicle system user interface based on a composition of the group of vehicle occupants,
wherein said plurality of modes comprises a plurality of modes for a vehicle with a driver and a plurality of non-driving passengers having a plurality of characteristics, and
wherein said plurality of characteristics includes a heartbeat of a non-driving passenger having a predetermined heartbeat rate.

26. A system for detection of a vehicle occupant and control of a user interface comprising:
at least one sensor for sensing a presence of a vehicle occupant; and
a controller for selecting one of a plurality of modes of use for a vehicle system user interface based on a composition of the group of vehicle occupants,
wherein said plurality of modes comprises a plurality of modes for a vehicle with a driver and a plurality of non-driving passengers having a plurality of characteristics, and
wherein said plurality of characteristics includes a heartbeat pattern of a non-driving passenger having a predetermined shape.

27. The system according to claim 13, wherein said sensor comprises a manually-controlled sensor.

28. The system according to claim 13, wherein said sensor comprises a user-programmable sensor.

29. A system for controlling a vehicle information system user interface comprising:
at least one sensor for sensing a presence of a non-human passenger, said non-human passenger being an animal;
a controller for controlling a vehicle information system user interface based upon an output signal from said sensor; and
a scent dispenser coupled to said at least one sensor,
wherein when said non-human presence is sensed, said scent dispenser is activated.

30. A system, for controlling a vehicle information system user interface comprising:
at least one sensor for sensing a presence of a non-human passenger; and
a controller for controlling a vehicle information system user interface based upon an output signal from said sensor,
wherein said presence of a non-human passenger is sensed by at least one of sensing a predetermined heartbeat rate and a predetermined heartbeat shape.

31. A system for controlling a vehicle information system user interface comprising:
at least one manually-controlled sensor, manually controllable by said user, for sensing a presence of a non-human passenger, said non-human passenger being an animal;
a controller for controlling a vehicle information system user interface based upon an output signal from said at least one manually-controlled sensor; and
a scent dispenser coupled to said at least one sensor,
wherein when said non-human presence is sensed, said scent dispenser is activated.

32. The system, as claimed in claim 13, wherein said plurality of modes are coupled such that a change in a value of a first mode is offset by a change in a value of a second mode such that a total value of said coupled modes remains substantially the same.

33. The system of claim 13, wherein two or more modes of said plurality of modes are adjusted simultaneously and qualitatively to supplement each other.

34. The system of claim 1, wherein said system is for use with at least one of diagnostics, e-mail, news, weather, traffic, concierge, emergency help, and entertainment.

35. The system of claim 13, wherein said system is for use with at least one of diagnostics, e-mail, news, weather, traffic, concierge, emergency help, and entertainment.

36. The system of claim 1, wherein said controller controls the vehicle information system user interface in an operable mode to selectively provide an active, attenuated level of interaction therewith for the driver.

37. The system of claim 13, wherein said controller controls the vehicle information system user interface in an operable mode to selectively provide an active, attenuated level of interaction therewith for the driver.

* * * * *